United States Patent [19]

Welch

[11] Patent Number: 4,675,357

[45] Date of Patent: Jun. 23, 1987

[54] NEAR INFRARED ABSORBING POLYMERIZATE

[75] Inventor: Cletus N. Welch, Clinton, Ohio

[73] Assignee: PPG Industries, Inc., Pittsburgh, Pa.

[21] Appl. No.: 614,883

[22] Filed: May 29, 1984

Related U.S. Application Data

[63] Continuation-in-part of Ser. No. 485,994, Apr. 18, 1983, abandoned.

[51] Int. Cl.[4] .......................... C08K 3/10; F21V 9/04
[52] U.S. Cl. ...................................... 524/406; 526/90; 252/587
[58] Field of Search ..................... 56/90; 252/587; 262/429 R; 524/406

[56] References Cited

U.S. PATENT DOCUMENTS

| | | | |
|---|---|---|---|
| 3,355,294 | 11/1967 | Giddings | 96/98 |
| 3,370,026 | 2/1968 | Patello et al. | 526/90 |
| 3,576,755 | 4/1971 | Patella et al. | 252/300 |
| 3,692,688 | 9/1972 | Castellion et al. | 252/300 |
| 3,816,491 | 6/1974 | Wilkinson et al. | 260/429 R |
| 4,069,168 | 1/1978 | Leatherman et al. | 252/300 |
| 4,181,626 | 1/1980 | Leatherman | 252/300 |
| 4,396,737 | 8/1983 | Leatherman | 524/176 |

OTHER PUBLICATIONS

Chem. Abstracts, vol. 91, Entry 91:185833u.
Sandhu et al, "Reaction Products of Zirconium Tetrachloride With Phenols and Aromatic Acids", Current Science, No. 6, Jun. 1960.
M. A. El-Sayed, "A New Class of Photochromic Substances: Metal Carbonyls", *J. Phys. Chem.*, 68(2), pp. 433–434, Feb., 64.
A. G. Massey, "A Reversible Photochromic Polymer," *Nature,* 4796, p. 1387, (Sep. 30, 1961).
G. A. Rasuiwajew et al, "Gewinnung und Eigenschaften einiger titanorganischer Verbindungen", Tetrahedron, 6, 159, (1959).

*Primary Examiner*—Joseph L. Scofer
*Assistant Examiner*—Peter F. Kulkosky
*Attorney, Agent, or Firm*—Irwin M. Stein

[57] ABSTRACT

Disclosed is a near infrared absorbing polymerizate prepared from bis(allyl carbonate) monomer containing the reaction product of tungsten hexachloride and phenolic compounds.

15 Claims, No Drawings

NEAR INFRARED ABSORBING POLYMERIZATE

CROSS REFERENCE TO RELATED APPLICATIONS

This application is a continuation-in-part application of my copending application, U.S. Ser. No. 485,994 filed April 18, 1983 of the same title, now abandoned.

DESCRIPTION OF THE INVENTION

Near infrared absorbing optical castings are desired in order to block the passage of infrared radiation from an incident source to the eye. By "near infrared" is meant that portion of the electromagnetic spectrum having a wave length of from about 700 to about 2000 nanometers.

U.S. Pat. No. 4,069,168 to I. R. Leatherman and M. S. Misura for Tungsten Hexacarbonyl In Plastic Lenses describes polymers prepared from bis(allyl carbonate) monomers, which polymers contain a photochromic amount of tungsten hexacarbonyl, i.e., from 0.1 to 0.5 weight percent. However, the compositions described in that patent have limited resistance to hydrolysis and the level of active tungsten present therein is low.

U.S. Pat. No. 4,181,626 to I. R. Leatherman for Method Of Preparing Tungsten Hexacarbonyl Containing Polymers And Polymers Prepared Thereby, describes a near infrared absorbing bis(allyl carbonate) polymerizate containing a near infrared absorbing amount of tungsten hexacarbonyl and a solubility enhancing amount of an olefinically unsaturated dicarboxylic acid, or its anhydride form, e.g., maleic acid anhydride. However, two properties of maleic acid anhydride, i.e., its dermal toxicity and low boiling point, i.e., a high vapor pressure, present obstacles to its use commercially.

It has now been found that the susceptibility to hydrolysis of tungsten hexacarbonyl can be lessened and the difficulties associated with the use of maleic acid anhydride can be avoided by introducing the tungsten moiety into the bis(allyl carbonate) polymerizate as the reaction product of tungsten hexachloride and a hydroxy aromatic compound of the general formula, PhOH, wherein Ph is phenyl or a substituted phenyl group, i.e., a tungsten phenoxide. Tungsten phenoxides typically possess a higher resistance to hydrolysis than other tungsten organo-metallic compounds.

DETAILED DESCRIPTION OF THE INVENTION

It has now been found that near infrared absorbing amounts of a tungsten moiety can be readily and conveniently incorporated into transparent polymers such as bis(allyl carbonate) polymer matrices, in amounts sufficient to produce optically clear castings that are permanently light absorbing and that have substantial infrared absorbance. By "permanently light absorbing" is meant the substantial absence of a return to a water-white condition when shielded from ultraviolet radiation. By "substantial infrared absorbance" is meant absorbance in the near infrared region at least as great as the average absorbance in the visible region of the electromagnetic spectrum.

In accordance with the present invention, a suitable tungsten compound, e.g., tungsten hexachloride, is reacted with a phenol-type compound to form a reaction product. For example, tungsten hexachloride can be mixed with phenol at room temperature and the mixture melted. Alternatively, tungsten hexachloride may be added to liquified phenol. The reaction is accompanied by gas evolution from the reacting medium. The reaction product of phenol and tungsten hexachloride is a solid which is permanently dark red.

While not wishing to be bound by any particular theory, the aforesaid solid reaction product is believed to be a tungsten phenoxide. As used herein, the term "tungsten phenoxide" is intended to refer to the reaction product of the suitable tungsten compound, e.g., tungsten hexachloride, and the phenolic-type compound, e.g., phenol. The mole ratio of the phenolic-type compound to tungsten in the tungsten phenoxide will typically vary from 3:1 to 6:1.

Phenolic-type compounds contemplated herein for reaction with the tungsten compound are hydroxy aromatic compounds of the general formula, PhOH, wherein Ph is phenyl or a substituted phenyl group. More particularly, the phenolic-type compounds can be represented by the following graphic formulae:

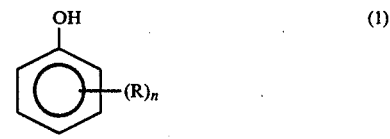

wherein R is selected from the group consisting of hydroxy, $C_1$-$C_{12}$ alkyl, phenyl, phen ($C_1$-$C_4$) alkyl, $C_1$-$C_{12}$ alkoxy, phenoxy, phen ($C_1$-$C_4$) alkoxy and n is 0 or 1. Preferably, R is selected from the group consisting of hydroxy, $C_1$-$C_4$ alkyl, phenyl, phen ($C_1$-$C_2$) alkyl, $C_1$-$C_4$ alkoxy, phenoxy and phen ($C_1$-$C_2$) alkoxy;

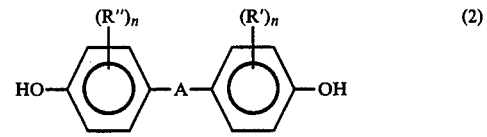

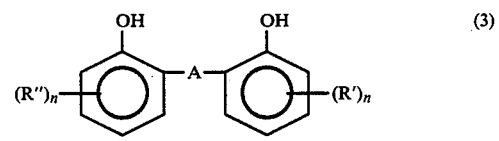

wherein A is a divalent alkyl radical, e.g., an alkylidene radical, having from one to four carbon atoms, e.g., methylene, ethylidene, alpha, alpha'-dimethylmethylene, etc., and R' and R" are each selected from the group consisting of $C_1$-$C_{12}$ alkyl, $C_1$-$C_{12}$ alkoxy and n is 0 or 1. Preferably, R' and R" are $C_1$-$C_4$ alkyl or alkoxy; and

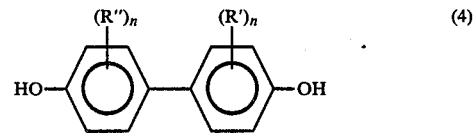

wherein R', R" and n are as defined above with respect to formulae (2) and (3). When n is 1, the R, R' or R" group attached directly to the and (3). When n is aromatic ring can be in the ortho, meta or para position, more usually in the ortho or para position. Examples of the above-described phenolic type compounds are: phenol, catechol, resorcinol, hydroquinone, cresol, tertiarybutyl phenol, tertiaryamyl phenol, p-ethyl phenol, p-propyl phenol, o, m, and p-phenyl phenol, p-benzyl phenol, p-phenyl ethylene phenol, p-cumyl phenol, p-methoxy phenol, p-ethoxy phenol, p-phenoxy phenol, o-phenoxy phenol, o-and p-benzyloxy phenol, p,p'-biphenol, 4,4'-isopropylidene diphenol, 4,4'-methylene bis(2-ditertiarybutyl phenol), 4,4-ethylidenebis(2-methyl phenol), 2,2'-methylene-bis(4-methyl phenol), and 2,2'-methylene-bis(6-tertiary butyl phenol).

Tungsten compounds contemplated for use in preparing the tungsten phenoxide reaction products include polyhalo tungsten compounds such as tungsten hexachloride, tungsten pentachloride, tungsten hexafluoride, tungsten hexabromide, tungsten pentabromide, tungsten oxytetrachloride, and tungsten oxytetrafluoride. Any other tungsten compound which will react with the liquified phenolic-type compound to form the tungsten phenoxide reaction product can also be used. Polychloro tungsten compounds are economically preferred.

The aforesaid phenolic-type reactant and tungsten compound, e.g., tungsten hexachloride, are reacted by mixing the two together at temperatures above the melting point of the phenolic reactant, i.e., when the phenolic reactant is in the liquid state. The mole ratio of the phenolic reactant to the tungsten compound, e.g., tungsten hexachloride, can vary, but commonly will be from about 3:1 to 6:1, e.g., from 4:1 to 5:1. Preferably, the mole ratio is about 5:1.

Associated with the aforesaid reaction is the evolution of hydrogen halide, e.g., hydrogen chloride, which can be passed through a suitable scrubbing tower containing an alkaline reagent, such as sodium hydroxide, to neutralize the hydrogen halide and prevent its emission to the atmosphere. The mixture of polyhalo tungsten compound, e.g., tungsten hexachloride, and phenolic reactant is heated for a time sufficient to complete the reaction, which can be observed when hydrogen halide, e.g., hydrogen chloride, gas ceases to evolve. Heating should not be continued after gas evolution has ceased, as the product produced by continued heating is less soluble in diethylene glycol bis(allyl carbonate) monomer and is less stable in the presence of moisture.

During heating and gas evolution, the above-described reaction product forms as a dark red solid in the reaction mixture. The tungsten phenoxide product prepared by the reaction of phenol and tungsten hexachloride at a mole ratio of 5:1, for example, has a fusion temperature of about 55° C. The solid reaction product may be recovered for subsequent addition to the polymerizable monomer into which it is to be incorporated, e.g., diethylene glycol bis(allyl carbonate) monomer liquid. Alternatively, a solution of the reaction product, e.g., tungsten phenoxide, in the monomer can be obtained by washing the reaction product with the monomer, the resulting wash liquor being the desired solution.

The amount of reaction product, e.g., tungsten phenoxide, added to the monomer, and hence to the transparent polymer, to obtain the desired near infrared absorbing properties may vary from about 0.01 to about 1.0, e.g., 0.01–0.1 weight percent (calculated as tungsten), basis the polymerizable monomer. In castings 1 to 4 millimeters thick, the use of amounts less than 0.01 weight percent of tungsten phenoxide will provide insufficient infrared absorption, whereas the use of amounts greater than 1.0 weight percent will result in too little transmission of visible light, i.e., less than about 10 percent transmission. However, in applications where little transmission of visible light is desired, e.g., welding goggles and flash shields, concentrations of 1.0 weight percent or more tungsten phenoxide, calculated as above, can be utilized in the monomer, e.g, concentrations up to the solubility limit of the tungsten phenoxide in the monomer.

The polymerizable monomers that may be used to produce the near infrared absorbing optical castings described herein are those monomeric materials which, when polymerized, result in a transparent solid polymerizate that possesses clarity sufficient for use in optical applications. The degree of clarity can, of course, vary with the ultimate application and use. The polymerizate can be prepared by homopolymerizing the monomeric materials described herein or copolymerizing such monomers with other copolymerizable vinylic, allylic or ethylenically unsaturated monomers, as is known in the art. Among the monomeric materials contemplated for preparing the aforesaid transparent polymerizates are polyol(allyl carbonate) monomers, e.g., diethylene glycol bis(allyl carbonate), lower alkyl esters of acrylic acids, e.g., methyl methacrylate, and carbonic acid esters of di(monohydroxyaryl) alkanes, e.g., the polycarbonate of Bisphenol A.

Polyol(allyl carbonate) monomers which can be utilized in this invention are liquid allyl carbonates of aliphatic and aromatic polyols, e.g., diethylene glycol bis(allyl carbonate). The allyl groups may be substituted at the 2-position with a halogen, notably chlorine or bromine, or an alkyl group containing from 1 to 4 carbon atoms, generally a methyl or ethyl group. The glycol group may be an alkylene, alkylene ether, alkylene polyether or alkylene carbonate group having from 2 to 10 carbon atoms. The bis(allyl carbonate) monomers can be represented by the graphic formula:

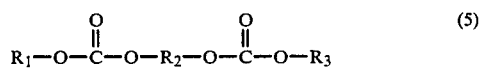

$$R_1-O-\overset{\overset{O}{\|}}{C}-O-R_2-O-\overset{\overset{O}{\|}}{C}-O-R_3 \qquad (5)$$

wherein $R_1$ and $R_3$ are independently allyl or substituted allyl groups, and $R_2$ is a divalent radical derived from the aliphatic or aromatic glycol. $R_1$ and $R_3$ are independently represented by the formula:

$$H_2C=\overset{\overset{R_4}{|}}{C}-CH_2- \qquad (6)$$

wherein $R_4$ may be hydrogen, halogen, or a $C_1$–$C_4$ alkyl group. Specific examples of $R_1$ and $R_3$ include allyl, 2-chloroallyl, 2-bromoallyl, 2-iodoallyl, 2-fluoroallyl, 2-methallyl, 2-ethylallyl, 2-isopropylallyl, 2-n-propylallyl, and 2-n-butylallyl groups. Most commonly, $R_1$ and $R_3$ are the same and are the allyl group, $H_2C=CH-CH_2-$. Bis(allyl carbonate) monomers and methods for making them are disclosed in U.S. Pat. Nos. 2,370,567 and 2,403,113.

$R_2$ is the residue of an aliphatic or aromatic compound that contains at least two hydroxy groups, e.g., an aliphatic glycol or bisphenol. The aliphatic glycol can be linear or branched and contain from 2 to 10 carbon atoms. Commonly, the aliphatic glycol is an alkylene glycol having from 2 to 4 carbon atoms or a poly($C_2$–$C_4$ alkylene glycol), e.g., ethylene glycol, propylene glycol, trimethylene glycol, tetramethylene glycol, or diethylene glycol, triethylene glycol, etc.

Specific examples of the radical $R_2$ include: alkylene groups containing from 2 to 10 carbon atoms such as ethylene (—$CH_2$—$CH_2$—), trimethylene, methylethylene, tetramethylene, ethylethylene, pentamethylene, hexamethylene, 2-methylhexamethylene, octamethylene, and decamethylene; alkylene ether groups such as —$CH_2$—O—$CH_2$—, —$CH_2CH_2$—O—$CH_2CH_2$—, —$CH_2$—O—$CH_2CH_2$—, and —$CH_2CH_2CH_2$—O—$CH_2CH_2CH_2$—; alkylene polyether groups such as —$CH_2CH_2$—O—$CH_2CH_2$—O—$CH_2CH_2$—, —$CH_2CH_2CH_2$—O—$CH_2CH_2CH_2$—O—$CH_2CH_2CH_2$— alkylene carbonate and alkylene ether carbonate groups such as —$CH_2CH_2$—O—CO—O—$CH_2CH_2$— and —$CH_2CH_2$—O—$CH_2CH_2$—O—CO—O—$CH_2CH_2$—O—$CH_2CH_2$—; and the isoalklidene bis(phenyl) group such as isopropylidene bis(para-phenyl)group. Most commonly, $R_2$ is —$CH_2CH_2$—, —$CH_2CH_2$—O—$CH_2CH_2$—, or —$CH_2CH_2$—O—$CH_2CH_2$—O—$CH_2CH_2$—.

Specific examples of diol bis(allyl carbonate) monomers useful in the invention herein contemplated include ethylene glycol bis(2-chloroallyl carbonate), diethylene glycol bis(allyl carbonate), diethylene glycol bis(2-methallyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), and isopropylidene bis(paraphenyl allyl carbonate).

Commercially important bis(allyl carbonate) monomers which can be used in the invention herein contemplated are triethylene glycol bis(allyl carbonate), diethylene glycol bis(allyl carbonate) and ethylene glycol bis(allyl carbonate). Diethylene glycol bis(allyl carbonate) is preferred.

Because of the process by which the polyol(allyl carbonate) monomer is prepared, i.e., by phosgenation of the polyol or allyl alcohol and subsequent esterification by the allyl alcohol or polyol respectively, the monomer product can contain related monomer species in which the moiety connecting the allyl carbonate groups contains one or more carbonate groups. These related monomer species can be represented by the graphic formula:

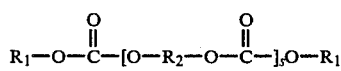
(7)

wherein $R_1$ is as defined above with respect to graphic formula (5), $R_2$ is a divalent radical, e.g., alkylene or phenylene, derived from a diol, and s is a whole number from 2 to 5. Diethylene glycol bis(allyl carbonate) related monomer species can be represented by the graphic formula,

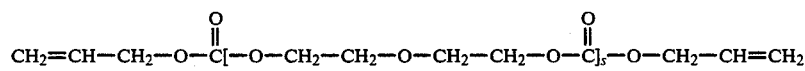
(8)

wherein s is a whole number from 2 to 5. The polyol(allyl carbonate) monomer can typically contain from 2 to 20 weight percent of the related monomer species and such related monomer species can be present as mixtures, i.e., mixtures of the species represented by s being equal to 2, 3, 4 etc.

As used in the present description and claims, the term polyol(allyl carbonate) monomer or like names, e.g., diethylene glycol bis(allyl carbonate), are intended to mean and include the named monomer and any related monomer species contained therein.

In addition, the polymerizable polyol(allyl carbonate) monomer, e.g., diol bis(allyl carbonate) such as diethylene glycol bis(allyl carbonate), can be a prepolymer of the monomer, i.e., a partially polymerized monomer, as is known in the art, and references in the description and claims to the monomer is also intended to include the prepolymer prepared from such monomeric species.

The polyol (allyl carbonate) monomer (with or without related monomer species) or prepolymer can also be copolymerized with other vinylic, allylic or ethylenically unsaturated materials to prepare the solid near infrared absorbing polymerizates described herein. Examples of such materials include mono- and poly-functional acrylates, vinyl esters of saturated monocarboxylic acids, styrene and polyurethanes having terminal acrylate functionality. These materials can be present in amounts of from about 1 to 30, e.g., 5 to 25 or 10 to 20, weight percent, basis the polyol(allyl carbonate) monomer. The exact amount used will depend on the particular copolymerizable unsaturated material used and the ultimate application.

Polyfunctional acrylate monomers useful as a copolymerizable monomer, especially when present at the 5 to 20, preferably 5–10, weight percent level, may be represented by the graphic formula;

(9)

which is the reaction product of the polyol, $R_5(OH)_i$, and an alpha-beta unsaturated carboxylic acid.

(10)

wherein $R_6$ is the acrylic acid moiety,

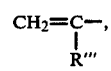

wherein $R'''$ is hydrogen or a $C_1$-$C_4$ alkyl group, e.g., methyl or ethyl; $R_5$ is the organic residue of the aliphatic polyol, which typically contains from 2 to 12, more typically 2 to 6, carbon atoms, and i is a whole number from 2 to 5, more usually 2 to 3. Preferably, the polyfunctional acrylate monomers are the di- or the triacrylates, more preferably the diacrylates.

Typically $R_6$ is an acrylic acid moiety chosen from the group consisting of acrylic acid,

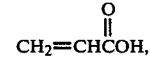

methacrylic acid,

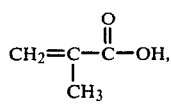

and ethylacrylic acid,

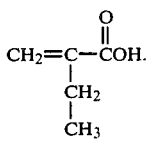

$R_5(OH)_i$ can be a diol, a triol, a tetracarbinol, or a pentacarbinol. Most commonly $R_5(OH)_i$ is a diol or triol. Typical diols useful in providing esters with terminal diacrylate functionality include: alpha, omega-glycols such as ethylene glycol, trimethylene glycol, 1,4-butanediol, 1,5-pentane diol and 1,6-hexanediol; 1,2-glycols such as propylene glycol; the hydrated ethylene oxide and propylene oxide condensation products such as diethylene glycol, triethylene glycol, tetraethylene glycol, dipropylene glycol, tripropylene glycol, tetrapropylene glycol and the like.

Examples of diacrylates include ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, trimethylene glycol diacrylate, trimethylene glycol dimethacrylate, butanediol diacrylate, butanediol dimethacrylate, pentanediol diacrylate, pentanediol dimethacrylate, hexanediol diacrylate, hexanediol dimethacrylate, propylene glycol diacrylate, propylene glycol dimethacrylate, dipropylene glycol diacrylate, dipropylene glycol dimethacrylate, tripropylene glycol diacrylate, tripropylene glycol dimethacrylate, tetrapropylene glycol diacrylate, tetrapropylene glycol dimethacrylate, and the like.

Suitable triacrylates include trimethylolpropane triacrylate, trimethylolpropane trimethacrylate, glycerol triacrylate, glycerol trimethacrylate, pentaerythritol triacrylate, and pentaerythritol trimethacrylate. Suitable tetraacrylates include pentaerythritol tetraacrylate and pentaerythritol tetramethacrylate.

Difunctional acrylate monomers, i.e., diacrylates and dimethacrylates, are the preferred polyfunctional acrylate monomers. Preferred are the diacrylates and dimethacrylates of aliphatic diols. Especially preferred aliphatic diol diacrylates and dimethacrylates are those having from about 4 to about 15 atoms, i.e., carbon atoms or carbon and oxygen atoms, between the carbonyl carbon atoms.

Monofunctional acrylates that can be used in the present invention are typically chosen from the group consisting of $C_1$ to $C_4$, preferably $C_1$ to $C_2$ alkyl and $C_5-C_6$ cycloalkyl, preferably cyclohexyl esters of the acrylic type acid of graphic formula (10), most notably, acrylic acid, methacrylic acid and 2-methylbutyric acid. The monofunctional acrylates can be present in amounts of from 5 to 20, e.g., 5 to 10, weight percent, basis the liquid polymer. Examples of monofunctional acrylates include: methyl acrylate, methyl methacrylate, ethyl methacrylate, butyl methacrylate, isobutyl methacrylate, and cyclohexyl methacrylate. The methacrylic acid esters, e.g., methyl methacrylate, are preferred.

Vinyl esters of the lower members of saturated monocarboxylic acids include the vinyl esters of $C_1-C_3$ monocarboxylic acids, e.g., formic acid, acetic acid and propionic acid, such as vinyl acetate. These materials may be used in amounts of from 1 to 25, e.g., 5 to 20, weight percent. Of particular interest are copolymers of polyol(allyl carbonate), e.g., diethylene glycol bis(allyl carbonate) with from 5 to 20 weight percent vinyl acetate.

Aliphatic polyurethanes having terminal acrylate functionality may be used as a copolymerizable material in amounts of from about 3 to 30 weight percent, e.g., 10 to 20 weight percent to improve the impact strength of the polyol(allyl carbonate) polymerizate. Such polyurethanes are described in U.S. Pat. No. 4,360,653 and the description of such polyurethanes found therein is incorporated herein by reference.

Esters of acrylic acid that may be used to prepare the solid, near infrared absorbing polymerizate are the $C_1-C_4$, preferably $C_1-C_2$ alkyl esters of the acrylic type acid of graphic formula (10). Most notably, the acids are acrylic acid, methacrylic acid and 2-methyl butyric acid. Preferably, the methyl ester of methacrylic acid is used, e.g., poly(methyl methacrylate).

Polycarbonate resin that may be used to prepare the solid, near infrared absorbing polymerizate are those materials akin to that disclosed in U.S. Pat. Nos. 3,028,365 and 3,117,019 and, preferably, are the carbonic acid esters of aromatic dihydroxy compounds, e.g., di(monohydroxyaryl) alkanes, such as 2,2-(4,4'-dihydroxydiphenyl) propane, i.e., Bisphenol A. The polycarbonate resins are commonly prepared by reacting the aliphatic or aromatic dihydroxy compound with phosgene in the presence of a Lewis acid, such as aluminum chloride, and an acid acceptor, such as pyridine; or by condensing the bischloroformate ester of the dihydroxy compound. Of particular commercial significance are the aromatic polycarbonate resins based on Bisphenol A, such as those available under the trademarks LEXAN and MERLON from General Electric Company and Mobay Chemical Company respectively.

The solid tungsten phenoxide reaction product can be either added to the polymerizable liquid monomer or the liquid monomer mixed with the solid tungsten phenoxide reaction product to form a tungsten-containing solution of polymerizable liquid monomer(s). In the case of the polycarbonate resin, a solution of the resin in a suitable solvent can be used to incorporate the tungsten phenoxide reaction product. These solutions can be relatively concentrated solutions, which are intended to be further diluted with further monomer. Alternatively, the solution can be a relatively dilute solution, i.e., a solution containing from about 0.01 to 1.0 weight percent tungsten, calculated as the metal, basis the monomer, which solution may be polymerized directly. In the case of the polycarbonate resin, the resin containing from 0.01 to 1.0 weight percent tungsten may be thermally formed, e.g., by injection molding or extrusion.

The optical density of the near infrared absorbing polymerizate is a function of the concentration of the tungsten phenoxide in the polymerizate and is a linear function of the thickness of the casting. Thus, where the casting is from about 2 to 3 millimeters thick, an optical density of about 1.0, i.e., a visible light transmission of 10 percent, may be obtained by providing about 0.1 weight percent tungsten in the casting.

Polymerization of the polyol(allyl carbonate) monomer or acrylic acid ester containing the tungsten phenoxide reaction product may be conducted in the manner well known in the art for such monomers. Initiators useful for carrying out such polymerization are free radical initiators, e.g., organic peroxides, which are also well known in the art. The preferred initiators are organic peroxy compounds such as peroxyesters, diacylperoxides, peroxydicarbonates and mixtures of such peroxy compounds.

The initiator is commonly dissolved in the monomer(s) in amounts of from 0.1 to 10 weight percent, e.g., 2 to 5 weight percent, and the initiator-containing monomer(s) heated to effect the polymerization. Heating may be at a constant temperature, at gradually increasing temperatures or at stepwise increasing temperatures for from 1 to 24 hours. Useful heat cycles for the polymerization of diethylene glycol bis(allylcarbonate) are described by Dial et al in "Polymerization Control in Casting a Thermosetting Resin", Industrial and Engineering Chemistry, Vol. 49, page 2447–2451 (December, 1955).

According to a particularly preferred exemplification of this invention, phenol is melted and tungsten hexachloride is added thereto at a mole ratio of 3 to 6 moles of phenol per mole of tungsten hexachloride. Heating continues so long as gas continues to evolve. Thereafter, heating is discontinued and diethylene glycol bis(allyl carbonate) is used to wash and dissolve the solid reaction product. In this way a solution is formed containing about 0.01 to 1.0 weight percent tungsten, calculated as the metal, basis diethylene glycol bis(allyl carbonate), in diethylene glycol bis(allyl carbonate). The tungsten-containing liquid monomeric solution is placed in molds, and initiator, e.g., from about 3 to 5 weight percent diisopropyl peroxydicarbonate is added thereto, whereby to form a near infrared absorbing polymerizate.

The polymerizate may be in the form of a sheet, i.e., a near infrared radiation absorbing sheet, or a shaped article such as an optical element, e.g., a lens.

The present invention is more particularly described in the following examples which are intended as illustrative only since numerous modifications and variations therein will be apparent to those skilled in the art.

EXAMPLE I

A near infrared absorbing sheet was made by polymerizing diethylene glycol bis(allyl carbonate) monomer that contained the reaction product of tungsten hexachloride and phenol. The tungsten-containing monomer was prepared in the following manner:

2.0 grams of tungsten hexachloride and 1.9 grams of phenol (a mole ratio of 1:4) were placed in a two ounce wide mouth bottle. The resulting solution was maintained under an argon gas flow. The solution was heated to about 60° C. in a water bath maintained at 65° C while being stirred. Hydrogen chloride gas evolved from the reaction mixture which solidified at about 65° C. after about 15 minutes.

The solid product was rinsed into a 300 cubic centimeter round bottom flask with 152 grams of PPG Industries, Inc. CR-39 ® diethylene glycol bis(allyl carbonate). The mixture was heated slowly to 65° C. over a period of 65 minutes to form a solution of the reaction product of phenol and tungsten hexachloride in diethylene glycol bis(allyl carbonate). The concentration of tungsten in the solution was calculated to be 0.60 weight percent. One part of the tungsten-containing solution was mixed with five parts of diethylene glycol bis(allyl carbonate) and the resulting diluted solution polymerized by adding 5 weight percent diisopropyl peroxydicarbonate thereto (basis the diluted solution) and placing the solution between two sheets of glass separated by a 0.125 inch (3 millimeter) thick gasket. The polymerization was carried out according to the cure cycle in Table I.

TABLE I

| CURE CYCLE | |
|---|---|
| Elapsed Time (Hours) | Temperature, °C. |
| 0 | 42 |
| 4 | 44 |
| 6 | 45 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 23.6 | 84 |
| 24 | 98 |
| 24.1 | 100 |

The resulting sheet was found to have a fifteen second Barcol hardness of 18 and 0.3 percent haze. After exposure overnight to a UV BLAK LITE, the sheet measured 14.6 percent light transmission at 550 nanometers. The 550 nanometers wavelength corresponds to the peak response of the human eye. The initial light transmission of a similarly cured diethylene glycol bis(allyl carbonate) sheet (without tungsten phenoxide) typically exhibits about 92 percent light transmission. Haze and light transmission were measured using a Hunter colorimeter.

EXAMPLE II

The procedure of Example I was followed except that 2.0 grams of tungsten hexachloride and 2.4 grams of phenol (a mole ratio of 1:5) was used and the reaction was conducted in a three-necked, 300 milliliter round bottom flask. 152 grams of the diethylene glycol bis(allyl carbonate) was added to the flask containing the solid reaction product. The resulting mixture was stirred at 55° C. for 3 hours to produce a deep dark red clear solution that was calculated to contain about 0.60 weight percent tungsten. One part of this solution was mixed with five parts of diethylene glycol bis(allyl carbonate) and the resulting diluted solution polymerized with 5 weight percent diisopropyl peroxydicarbonate.

The polymerizate (sheet) prepared from the aforesaid diluted solution was found to have a fifteen second Barcol hardness of 16, an initial light transmission of 89 percent and 0.8 percent haze. After exposure overnight to a UV BLAK LITE, the sheet measured 15.5 percent light transmission at 550 nanometers. Based on this value at 550 nanometers the percent light transmission at 960, 1200 and 1500 nanometers would be 0.87 percent, 2.33 percent and 14.2 percent respectively.

EXAMPLE III

The procedure of Example II was followed except that 2.6 grams of tungsten hexachloride and 3.6 grams of phenol (a mole ratio of 1:6) was used and the mixture was heated to 55° C. After all of the hydrogen chloride had evolved and the reaction mixture became solid, 195 grams of diethylene glycol bis(allyl carbonate) was added to the reaction flask containing the solid reaction product. The mixture was heated to 50° C. until all of the solid product dissolved. The resulting solution was a very deep dark red color that was calculated to contain about 0.60 weight percent tungsten. One part of this solution was diluted with 5 parts of diethylene glycol bis(allyl carbonate) and polymerized with 5 weight percent diisopropyl peroxydicarbonate.

The polymerizate (sheet) prepared from the aforesaid solution was found to have a fifteen second Barcol hardness of 14 and 0.4 percent haze. Light transmission at 550 nanometers was 16.2 percent after exposure overnight to a UV BLAK LITE.

EXAMPLE IV

The procedure of Example II was followed except that 2.55 grams of para-phenylphenol was mixed with 1.00 gram of tungsten hexachloride and the mixture heated to 165° C. Fusion of the mixture occured accompanied by hydrogen chloride gas evolution. After 5 minutes at these conditions, the reaction mixture solidified. 76 grams of diethylene glycol bis(allyl carbonate) was added to the reaction flask and the resulting solution was very deep dark red in color. The solution was calculated to contain about 0.59 weight percent tungsten. One part of this solution was diluted with five parts of diethylene glycol bis(allyl carbonate) and polymerized with 5 weight percent diisopropyl peroxydicarbonate. The polymerizate was found to have a fifteen second Barcol hardness of 7, which indicated that the level of peroxide used was insufficient to produce a fully cured polymerizate.

Although the present invention has been described with reference to specific details of specific embodiments thereof, it is not intended that such details be regarded as limitations upon the scope of the invention except as and to the extent that they are included in the following claims.

I claim:

1. A near-infrared absorbing article of (a) solid transparent synthetic resin of polyol(allyl carbonate) monomer and (b) a near-infrared absorbing amount of the reaction product of tungsten hexachoride and phenol, said amount of the reaction product being soluble in the poly(allyl carbonate) monomer, and said reaction product being formed by heating a mixture of the tungsten hexachloride and liquid phenol at temperatures below about 65° C. until the evolution of hydrogen chloride gas ceases, the mole ratio of phenol to tungsten hexachloride being from about 4:1 to 6:1.

2. The article of claim 1 wherein the near-infrared absorbing amount of reaction product is from about 0.01 to about 1.0 weight percent (calculated as tungsten), based on the synthetic resin.

3. The article of claim 2 wherein the near-infrared absorbing amount is from about 0.01 to about 0.1 weight percent.

4. The article of claim 2 wherein the mole ratio of phenol to tungsten hexachloride is about 4:1 to 5:1.

5. The article of claim 1 wherein the synthetic resin is selected from bis(allyl carbonates) represented by the graphic formula,

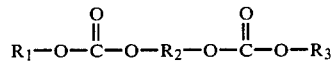

wherein $R_1$ and $R_3$ are each allyl, halo-substituted allyl or $C_1$–$C_4$ alkyl substituted allyl, and $R_2$ is a $C_2$–$C_4$ alkylene glycol, $C_2$–$C_4$ alkylene ether, or poly($C_2$–$C_4$ alkylene glycol).

6. A near-infrared absorbing article of (a) solid transparent synthetic resin of alkylene glycol bis (allyl carbonate) monomer and (b) from 0.01 to 1.0 weight percent (calculated as tungsten) of the reaction product of tungsten hexachloride and phenol, said amount of the reaction product being soluble in the alkylene glycol bis (allyl carbonate) monomer, and said reaction product being formed by heating a mixture of tungsten hexachloride and liquid phenol at temperatures below about 65° C. until the evolution of hydrogen chloride gas ceases, the mole ratio of phenol to tungsten hexachloride being from about 4:1 to 6:1.

7. The article of claim 6 wherein the synthetic resin is poly-.

8. The article of claim 7 wherein the near-infrared absorbing amount of the reaction product is from about 0.01 to 0.1 weight percent (calculated as tungsten), based on the synthetic resin.

9. The article of claim 7 wherein the mole ratio of phenol to tungsten hexachloride is from about 4:1 to 5:1.

10. A composition of polyol(allyl carbonate) monomer and from about 0.01 to 1.0 weight percent (calculated as tungsten) of the reaction product of tungsten hexachloride and phenol, said amount of the reaction product being soluble in the polyol(allyl carbonate) monomer, and said reaction product being formed by heating a mixture of tungsten hexachloride and liquid phenol at temperatures below about 65° C. until the evolution of hydrogen chloride gas ceases, the mole ratio of phenol to tungsten hexachloride being form about 4:1 to 6:1.

11. The composition of claim 10 wherein the polyol (allyl carbonate) is represented by the graphic formula,

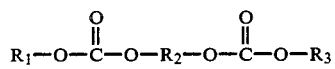

wherein $R_1$ and $R_3$ are each selected from the group consisting of allyl, halo-substituted allyl or $C_1$–$C_4$ alkyl substituted allyl and $R_2$ is a $C_2$–$C_4$ alkylene glycol, $C_2$–$C_4$ alkylene ether, or poly ($C_2$–$C_4$ alkylene glycol).

12. The composition of claim 10 wherein the polyl(allyl carbonate) is diethylene glycol bis(allyl carbonate).

13. The composition of claim 11 wherein the mole ratio of phenol to tungsten is from about 4:1 to 5:1.

14. The composition of claim 12 wherein the mole ratio of phenol to tungsten hexachloride is from about 4:1 to 5:1.

15. The composition of claim 14 wherein the tungsten hexachloride-phenol reaction product is present in amounts of from 0.01 to 0.1 weight percent (calculated as tungsten) based on the diethylene glycol bis(allyl carbonate).

* * * * *